United States Patent

Carey et al.

[11] Patent Number: 5,784,456
[45] Date of Patent: Jul. 21, 1998

[54] SINGLE-LINE MULTI-HANDSET TELEPHONE

[75] Inventors: Kevin J. Carey, Evanston, Ill.; Mark Myers, Tucson, Ariz.

[73] Assignee: CyraCom International, Inc., Tucson, Ariz.

[21] Appl. No.: 496,536

[22] Filed: Jun. 29, 1995

[51] Int. Cl.[6] ............................................. H04M 1/00
[52] U.S. Cl. .................. 379/419; 379/67; 379/202; 379/387
[58] Field of Search ................... 379/419, 424, 379/428, 387, 395, 373, 377, 447, 88, 80, 67, 205, 216, 201, 202; 439/621, 622, 698

[56] References Cited

U.S. PATENT DOCUMENTS

| | | | |
|---|---|---|---|
| 3,748,397 | 7/1973 | Jones | 379/395 |
| 3,919,491 | 11/1975 | Luce | 179/41 |
| 4,107,477 | 8/1978 | Morrison | 179/100 R |
| 4,362,905 | 12/1982 | Ismail | 439/621 |
| 4,752,949 | 6/1988 | Steinbeck et al. | 379/61 |
| 4,817,138 | 3/1989 | Thomke et al. | 379/419 |
| 4,866,755 | 9/1989 | Hashimoto | 379/80 |
| 5,010,565 | 4/1991 | Nash et al. | 379/61 |
| 5,012,508 | 4/1991 | Gibbens, Jr. | 379/395 |
| 5,105,460 | 4/1992 | Williams | 379/155 |
| 5,134,649 | 7/1992 | Gutzmer | 379/99 |
| 5,136,637 | 8/1992 | Rust et al. | 379/216 |
| 5,173,936 | 12/1992 | Ditzig et al. | 379/440 |
| 5,249,985 | 10/1993 | Obenauer | 439/621 |
| 5,278,893 | 1/1994 | Voser et al. | 379/61 |
| 5,297,183 | 3/1994 | Bareis et al. | 379/67 |
| 5,301,230 | 4/1994 | Barry | 379/447 |
| 5,353,335 | 10/1994 | D'Urso et al. | 379/67 |
| 5,367,570 | 11/1994 | Figueroa | 379/434 |
| 5,375,164 | 12/1994 | Jennings | 379/88 |
| 5,440,615 | 8/1995 | Caccuro et al. | 379/67 |
| 5,603,591 | 2/1997 | McLellan | 410/97 |
| 5,604,798 | 2/1997 | Sacchetti et al. | 379/387 |

FOREIGN PATENT DOCUMENTS 60-19347  1/1985  Japan ...................... 379/338

*Primary Examiner*—Ahmad F. Matar
*Assistant Examiner*—Jacques M. Saint-Surin
*Attorney, Agent, or Firm*—Hill & Simpson

[57] ABSTRACT

A single-line multi-handset telephone is disclosed. The telephone includes a base, a plurality of handset cradles, a jack which receives an external telephone line, a multi-port handset connector, and telephone circuitry which connects the jack and the multi-port connector. A plurality of handsets are positionable in the handset cradles, and each handset includes a handset cord connected to the multi-port handset connector. The telephone may include an amplifier and a power cord for supplying additional power to the system so that the multiple handsets and conventional telephone functions do not exceed the power limit allowed by a conventional telephone line. The telephone may also include an interpretation service selection mechanism for automatic dialing of telephone numbers which call a selected language-specific translator. Once an interpreter is called, different language-speaking people can use the multiple handsets to converse with the interpreter. The multi-handset telephone may also be formed from a conventional telephone and a multi-handset adapter.

15 Claims, 3 Drawing Sheets

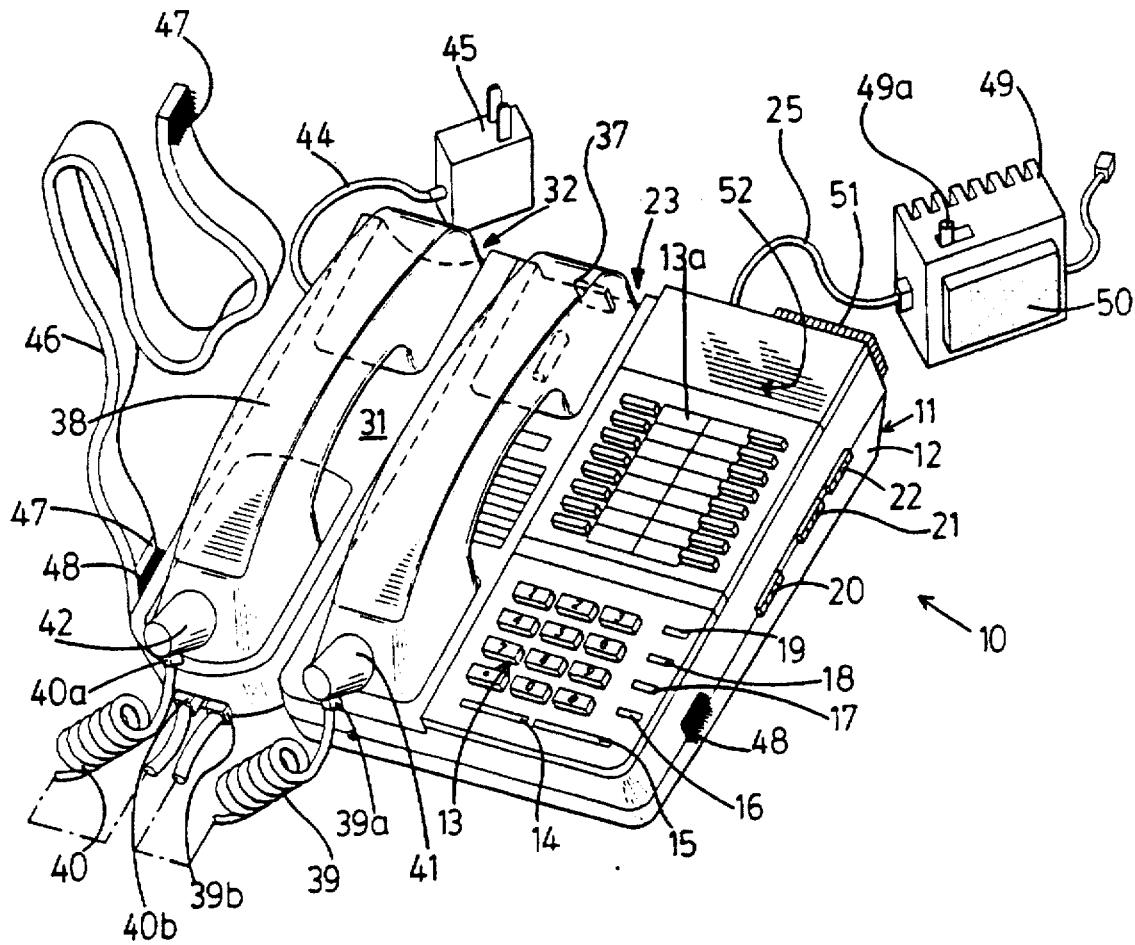
FIG 1
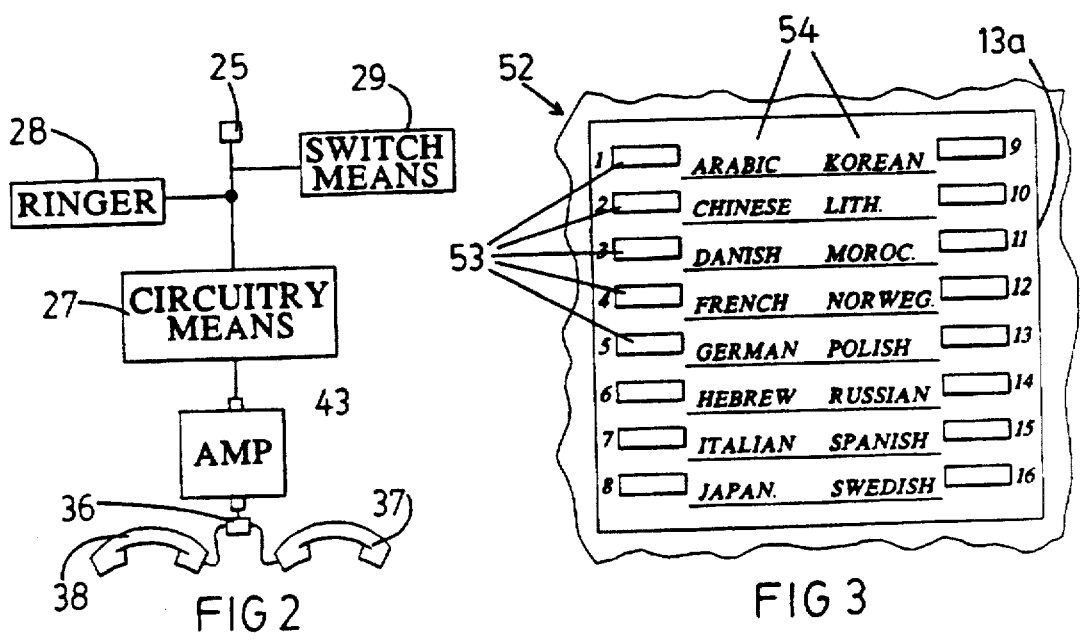
FIG 2
FIG 3

SINGLE-LINE MULTI-HANDSET TELEPHONE

BACKGROUND AND SUMMARY

This invention relates to telephones, and more particularly, to a telephone which includes two or more handsets to allow two or more people at one location to talk on a single telephone line. The single-line multi-handset telephone of this invention is particularly useful at tradeshows and will be generally discussed in connection with such use. However, it will be understood that this invention is not so limited and that the inventive telephone can be used in many environments, some of which are described herein.

Perhaps the most common device for enabling two or more people to use the same telephone and talk on a single line is the speaker phone. However, speaker phones are ineffective on a crowded tradeshow floor due to excessive noise levels. Speaker phones also provide little privacy, no confidentiality, and effect the way a person communicates over the phone.

In order to avoid such problems associated with a speaker phone, tradeshow booths often include two or more telephones connected to a single telephone line for allowing two or more people to join in the same conversation. However, the solution of connecting two or more phones to a single incoming line is cost ineffective and excessively expensive. Enabling a tradeshow booth to hold multiple person phone conversation in this manner would cause them to incur double line and telephone rental charges. The telephone company can measure the impedance on the line by the number or receivers and determine the line charges by this resistance number.

Telephones having two handsets associated with one telephone have been proposed, and examples of such telephones are disclosed in U.S. Pat. Nos. 4,107,477, and 5,367,570. However, the dual handset telephone disclosed in the '477 patent includes complete circuitry for two telephones, including two hook switches, and the telephone is therefore expensive both from the viewpoint of initial costs (i.e., paying for the circuitry of two entire telephones) as well as possibly incurring two line charges from the telephone company. In the embodiment of the '477 patent in which the telephone is connected to a single line, it is believed that the two sets of complete circuitry in the telephone would in some instances use more power than is available on a single telephone line. There is a set limit in the amount of line power a phone may draw from a single line service. If the telephone's circuitry and functions exceed this limit, the line may "flatten out" and communication between users become hampered and interruptive.

In the dual handset telephone disclosed in the '570 patent, the two handsets are bolted together and are received in a single cradle with one of the handsets sticking up in the air. Not only are the coupled handsets unsightly when positioned in the cradle, but it is believed to be apparent that many users, especially strangers, would find the intimacy of using such a coupled dual handset to be highly objectionable.

The problems associated with the prior art telephones is the application of the usage of the devices within a tradeshow environment. Due to the increasing size of the pre-event promotions and the numbers of exhibitors, industry-based tradeshows are attracting a wider range of foreign attendees. The current system of on-site interpreters is very expensive and labor intensive. There have been estimates between 10 k and 50 k spent by show organizers to have interpreters present on site during these shows that may last up to a week or more. Many times during a large tradeshow there may be only a single person to handle the needs for one language. If there is a large following from a given country, this can be quite obtrusive in its ability to fairly handle and adequately serve the language needs of both the attendees and the exhibitor.

Over-lapping scheduled times and great travelling distance between booths make also the affair very arduous. The other side of the coin, the Department of Commerce sets up areas specifically designated for international business and its the basic "hang-out" for the international crowd. This is a disservice to the visitor, as they have paid extreme amounts of money to attend the show, and they must attend to their business off the floor. The domestic exhibitor also is at a disservice, in that, he isn't allowed to sell his product at his well-appointed and expensive point of sale—the booth.

Currently, tradeshow personnel sometimes use known interpretation services which provide interpreters over the telephone. Typically, the tradeshow person uses a speaker phone, calls the interpretation service, and the tradeshow person, the foreign-language speaking attendee and the translator all communicate over the speaker phone. However, using a speaker phone in a tradeshow environment is problematic at best due to excessive noise levels and loss of privacy. To overcome such problems, tradeshow personnel often use one telephone per person. However, this results in the tradeshow booth being charged a rental charge for each telephone as well as paying a line charge for each telephone.

An important aspect of this invention therefore lies in providing a single-line multi-handset telephone which essentially include only the basic circuitry of a single telephone. Such a construction avoids the cost associated with prior art constructions which include complete wiring for two telephones and may incur multiple-line charges. The multi-handset telephone also provides a conventionally-looking appearance and allows two or more people to remotely talk on the same telephone line while maintaining the conversation in private and avoiding interference from ambient noise. The inventive telephone may also include an amplifier and external power source so that the multi-handset telephone can include and use all conventional telephone functions without exceeding the power limit of 10 ren per telephone line. The purpose of the amplifier is to assist the conversants in hearing the third party, as well as supplement the line power. But it is also to assist the hearing disabled and the interpreter's dialect and pronunciation will not be lost due to either the ambient noise levels or the lack of line power.

Briefly, the single-line dual handset telephone of this invention comprises a primary base which includes a first cradle means for holding a handset, a first jack for connection to an external telephone line, a second jack for connection to a handset line, circuitry means for providing electrical communication between the first and second jacks, and ringing means operatively connected to the circuitry means for signaling when an incoming call is received. A secondary base is connected to the primary base and includes a second cradle means for holding a second handset. Wiring means are disposed within the second base for connecting the second jack of the primary base to the handset cords of first and second handsets. The wiring means may include a splitting means or multi-port handset connector which provides at least two handset ports for connection to the handset cords. The handsets are unconnected and independently positionable in the first and second cradle means. Switching means are also provided on one of the cradle means for selectively connecting or disconnecting the first and second handsets with a signal carried by the external telephone line.

In embodiments in which many handsets or multiple functions will be used on the telephone, the telephone may advantageously include amplification and external power source means connected to the wiring means for powering, amplifying and controlling the sound levels of communications transmitted through the plurality of handsets. The amplification and external power source means reduces the amount of rens used from the telephone line and allows those rens to be used for operating other functions of the telephone. The amplification and external power source means may take the form of an amplifier interposed in the wiring means and having a power cord and plug for connection to a power source such as a conventional 110 volt electrical socket.

Other features of this invention which are particularly applicable to the tradeshow environment include a secondary ringing means and a handset securement means. The secondary ringing means is connected to the external telephone line and is remotely positionable from the telephone for providing a ringing source close to where tradeshow personnel are located. The handset securement means may include a fabric strap and hook and loop attachment patches for securing the multiple handsets to the telephone during transportation. This is particularly important in tradeshow environments since telephones are typically rented from the convention center.

Another important feature which is particularly applicable in tradeshow environments lies in providing the telephone with translation service selection means for automatically dialing one of a plurality of telephone numbers which are each assigned to a language-specific translator. The interpretation service selection means may take the form of a speed dialer which includes a plurality of buttons provided on the telephone base. Each of the buttons is associated with a language-specific label or indicia, and each of the buttons are adapted to automatically dial a telephone number of a translator who speaks the language indicted by the language-specific indicia. Two different language-speaking people can automatically dial a translator who speaks both of their languages and each use one of the multiple handsets to converse using the translator. We believe that we are the first to attempt such an interactive situation. The phone is also capable of interconnecting two different languaged interpreters with two different ethnic show attendees and an exhibitor through the use of a third handset.

In another embodiment, the telephone may take the form of a hospitality telephone used in hotels and the like, such as at a reception or concierge desk. The telephone may advantageously include interpretation service selection means as previously described to facilitate conversations between hotel personnel and foreign-language speaking people. The hospitality telephone includes shielding means for covering the dialing means and interpretation service selection means to prevent guests or other unauthorized personnel from inadvertently calling an interpretation service. One reason for preventing such unauthorized use is that dialing the interpretation service might cause the hotel to incur interpretation service charges. The hospitality telephone may also include a display panel which is slidably received in the hospitality phone. The display panel may include the telephone numbers of between 1 and 200 different translators who are available to accommodate the many different languages that are often spoken by people who patronize hotels. The hospitality phone can also be used in medical and security oriented emergencies. This can be used both by the guests, for the guest, but also for the given company to advise any foreign speaking employee of any necessary statutory employment requirements and duties.

In another embodiment, the inventive telephone may take the form of a conventional telephone and a multi-handset adapter combination. The multi-handset adapter includes a plurality of cradle means for receiving a plurality of handsets. A multi-port connector is provided on the adapter for connection to the handset cord of the plurality of handsets. Wiring means are also provided in the handset adapter for connecting the multi-port connector to the handset jack of the conventional telephone. The adapter is preferably constructed to be engageable and connectable with the conventional telephone to form an aesthetically pleasing and streamlined unit.

Other features, advantages and objects of the present invention will become apparent from the specification and drawings.

BRIEF DESCRIPTION OF THE DRAWINGS

FIG. 1 is a perspective view of the multi-handset telephone embodying this invention.

FIG. 2 is a schematic plan view of the basic circuitry of the telephone embodying this invention.

FIG. 3 is an enlarged view of the interpretation service selection means associated with the telephone embodying this invention, the interpretation service selection means can be pre-programmed to any group of languages and those listed are just an example of the core group.

DETAILED DESCRIPTION OF PREFERRED EMBODIMENTS

Figure 4:
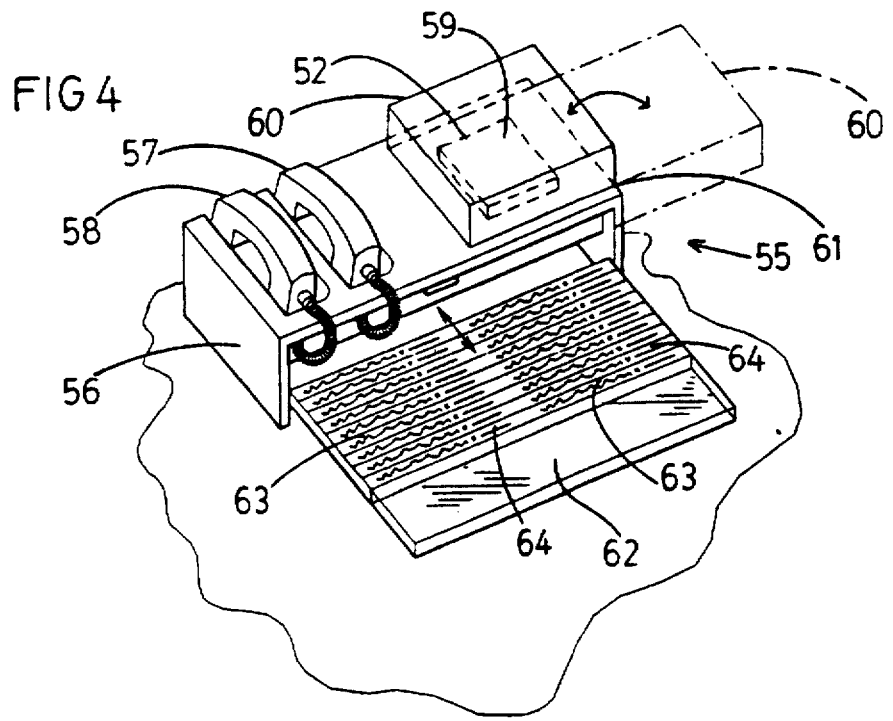
FIG. 4 is a perspective view of an alternate embodiment of the telephone of this invention.

Referring to the drawings, the numeral 10 generally designates a single-line multi-handset telephone having a primary telephone 11 which includes a base 12. The primary telephone 11 includes a numerical pad 13 for dialing telephone numbers, a programmable speed dialer 13a, a hold button 14, a speaker phone button 15, a call waiting button 16, a redial button 17, a pause button 18, a store button 19, a volume switch 20, a ringer volume switch 21, a tone or pulse selection button 22, and a first cradle means 23 for providing a resting place for a handset.

Referring to FIG. 2, the base 12 of primary telephone 11 includes a first jack 24 for connection to an external telephone line 25 and plug 25a and includes a second jack 26 for connection to a handset line. Circuitry means generally designated at 27 connect first and second jacks 24 and 26 and provide a means for providing electrical communication between jacks 24 and 26. Ringing means 28 are operatively connected to the circuitry means 27 for signalling when an incoming call is received on the external telephone line 25. Switching means generally designated at 29 are provided on the first cradle means 23 for selectively connecting or disconnecting second jack 26 with a signal carried by external telephone line 25. In the embodiment given in the drawings, the switching means take the form of a hook switch 30. The forgoing details of primary telephone 11 are entirely conventional, and primary telephone 11 can be a conventional telephone which is then modified as described hereinbelow. In one specific embodiment, the primary telephone 11 was constructed from a Freedom Phone (model number FM860) which is commercially available from Southwestern Bell.

A secondary base 31 is connected to the primary base 12, and secondary base 31 may take the form of a conventional telephone base which has had its circuitry and hook switch removed or disabled. Preferably, the secondary base 31 is hollowed out so that it primarily forms a shell which includes a second cradle means 32 for receiving a handset. Secondary base 31 may be connected to primary base 12 by bolts 33 which are schematically shown in FIG. 2 or any other suitable connection means. In the alternative, the primary base 12 and secondary base 31 may instead be integrally molded as a single unit. However, such a single unit should include essentially only the wiring of a single telephone such as described in connection with primary telephone 11.

Wiring means generally designated at 34 are disposed in secondary base 31 for connecting second jack 26 to the handset cords of multiple handsets. In the embodiment shown in the drawings, wiring means 34 include a wire 35 having a first end 35a connected to second jack 26 and second end 35b connected to a multi-port handset connector 36. The multi-port connector 36 acts as a splitting means for connecting wire 35 to two or more handset cords. In one specific embodiment, the multi-port connector 36 includes port 36a for connection to wire 35 and ports 36b and 36c for connection to handset cords. In one specific embodiment, the multi-port connector 36 was formed from a connector and sold under the designation SE-464 by Suttle Corporation of Hector, Minn. However, the multi-port jack 36 may take the form of any splitter which provides a multiplicity of ports for connection to a multiplicity of handset cords.

Referring the FIGS. 1 and 2, the telephone 10 includes a first handset 37 which is positionable in the first cradle 23 and a second handset 38 which is positionable in the second cradle 32. The handsets 37 and 38 are unconnected, independently positionable, and may respectively rest within the respective cradles 23 and 32. A first handset cord 39 connects handset 39 multi-port connector 36, and a second handset cord 40 connects the handset 38 to multi-port connector 36. In the embodiment shown, handset cords 39 and 40 each include proximal plugs 39a and 40a and distal plugs 39b and 40b. The distal plugs 39b and 40b are plugged into ports 36b and 36c of multi-port connector 36. Preferably, the proximal ends 39a and 40a of cords 39 and 40 are plugged into swivel ports 41 and 42 which are respectively connected to handsets 37 and 38. The swivel ports 41 and 42 are rotatably mounted in the handsets 35 and 36 and allow the handset cords 39 and 40 to be swiveled. Such swivel ports 41 and 42 are commercially available from TelCor Corporation of Muncie. Ind., or Tandy Corporation of Texas. However, use of such swivel ports with the present invention is particularly advantageous as the swivel ports 41 and 42 reduce the tendency of the adjacent cords 39 and 40 to become tangled when in use.

Preferably, amplification and external power source means are provided in wiring means 34 for powering, amplifying and controlling the sound levels of communications transmitted through handsets 39 and 40. The amplification and external power source means input additional power into the system and reduce the amount of power which must be supplied by external line 25. Accordingly, multiple handsets and conventional telephone functions may be used with telephone 10 without exceeding the power limit of the single telephone line. In the embodiment given in the illustrations, the amplification and external power source means take the form of an amplifier 43 which is connected to a power cord 44 and plug 45. Plug 45 is plugable into a standard 110 volt electrical socket. Amplifier 43 divides line 35 into two segments and is connected to line 35 by jacks 43a and 43b and plugs 35c and 35d on line 35. The amplifier 42 amplifies and powers the signals traveling through line 35 to handsets 37 and 38 and reduce the power which would otherwise be drawn from external telephone line 25. This leaves the power provided by the external power cord 25 available for running functions 13–22 previously described. The amplifier 42 and plug 45 can also be used to power two or more handsets so that any desired number of handsets can be used without taking power from external phone line 25. Amplifier 43 may also include a rotary volume control switch 43c for selectively adjusting the sound level of the communications transmitted through the headsets.

Referring to FIG. 3, the inventive multi-handset telephone 10 is schematically shown. The telephone 10 includes only one circuitry means 27, ringing means 28, and switching means 29 for forming an operable telephone. The handsets 37 and 38 are both connected to multi-port connector 36 so that both handsets 37 and 38 run off of the same circuitry, ringing and switching means. The single hook switch 30 of the switching means connects or disconnects the handsets 37 and 38 with a signal carried by external telephone line 25. Since telephone 10 only includes the circuitry of one telephone, it does not incur multiple line charges.

Securement means are also provided on telephone 10 for securing the handsets 37 and 38 to the respective bases 12 and 31 during transportation. In the embodiment given in FIG. 1, the securement means take the form a flexible fabric strap 46 having a pair of hook patches 47 on its opposite ends. A corresponding pair of loop patches 48 are provided on opposite ends of the telephone 10 so that strap 46 may be secured over handsets 37 and 38 to hold them in place in cradles 23 and 32 during transportation. The hook and loop patches may also be switched.

The telephone 10 may also include an auxiliary ringing means for signalling when an incoming call is received on external telephone line 25. In the embodiment given in FIG. 1, the auxiliary ringing means take the form of ringer 49 which is connected to external telephone line 25 and is remotely positionable from telephone 10. The ringer 49 may be positioned closer to where people are located than the telephone 10 in order the ensure that the users are alerted if an incoming call is received. Releasable attachment means are provided for attaching the auxiliary ringer 49 to the telephone 10 during transportation. In the embodiment given, the attachment means take the form of hook fabric 50 provided on ringer 49 and loop fabric 51 provided on base 12. The hook and loop fabric 50 and 51 may also be switched. The ringer 49 may also include a switch 49a for turning the auxiliary ringer 49 on and off.

Another important aspect of this invention lies in providing telephone 10 with interpretation service selection means for automatically dialing one of a plurality of telephone numbers which are each assigned to a language-specific translator. The telephone 10 allows an English-speaking (or any other language) person to use handset 37 while a non-English speaking (or different-language) person uses handset 38. The interpretation service selection means is then used to automatically dial a translator who speaks the languages of the people using handsets 37 and 38. In the embodiment given in the illustrations, the interpretation service selection means is designated at 52 and takes the form of speed dial 13a which is preprogrammed as shown in FIG. 4. The interpretation service selection means 52 is provided on primary base 12 and is operatively connected to circuitry means 27. Interpretation service selection means 52 includes a plurality of buttons 53 which are each preprogrammed to automatically dial the telephone number of a language-specific translator who speaks the language corresponding to the language-specific indicia labels 54. For example, pushing button 8 will automatically dial the number of a language-specific translator who speaks both Japanese and English. Advantageously, the buttons 53 are programmed to connect to translators who speak at least 15 different languages.

Another important aspect of this invention lies in providing a hospitality phone 55 having a plurality of handsets as shown in FIG. 4 and which may advantageously include interpretation service selection means. The hospitality telephone 55 includes a base 56 and handsets 57 and 58. The base 56 includes the wiring schematically shown in FIG. 2. The hospitality phone 55 also includes a number pad 59 which includes an interpretation service selection means 52 as described in connection with FIG. 3. The hospitality phone 55 may be provided at concierge or reception desks in hotels to allow hotel personnel to call an interpretation service and use the handsets 57 and 58 to allow the hotel clerk and a non-English speaking person to use the interpretation service to communicate.

Shielding means are provided on hospitality phone 55 for shielding the numerical pad 59 from use by nonauthorized personnel. In the embodiment given in the illustration, the shielding means takes the form of a cover 60 which is hingedly mounted on base 56 by a hinge 61 and is moveable between a first position in which it covers numerical pad 59 and a second position shown in dashed lines in which the numerical pad 59 is exposed. The shielding means prevents unauthorized personnel from hitting the buttons which connect to the interpretation service which could cause the hotel to incur interpretation service charges.

The hospitality phone 55 is also provided with a display panel 62 which is slidably received within base 56. The display panel 62 is slidable between a position in which it is contained in base 56 and a second position in which it is exposed. The display panel 62 includes a plurality of language designations 63 and corresponding telephone numbers 64. The numerical pad 59 can be preprogrammed for connection to 15 or more language-specific interpretation services while the display panel 62 may provide an additional 1 to 200 languages 63 and telephone numbers 64 to enable hotel personnel to easily gain access to hundreds of different translators.

Figure 6:
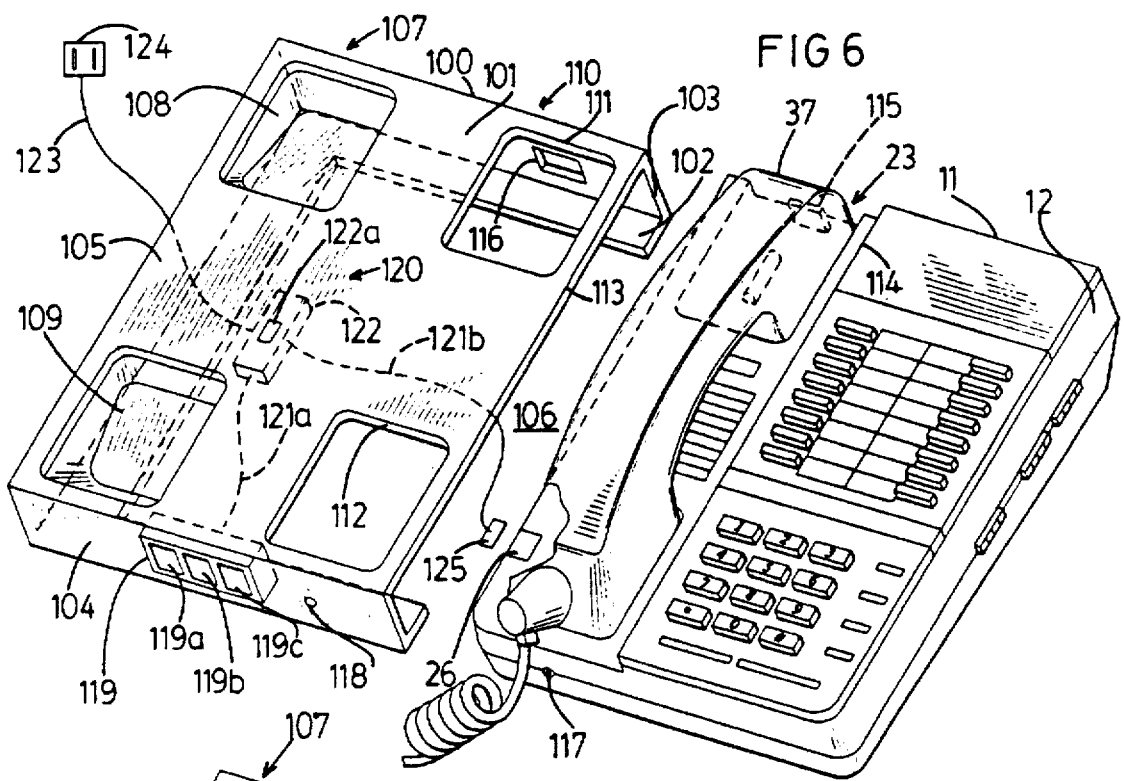
FIG. 6 is a perspective view of an alternate embodiment of a telephone and multi-handset adapter combination embodying this invention.
Figure 7:
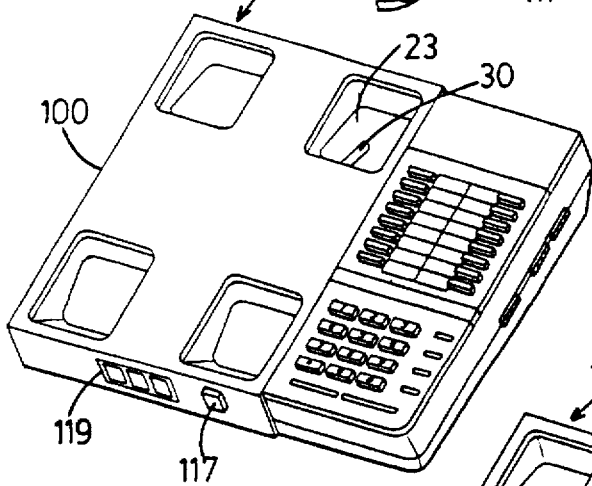
FIG. 7 is a perspective view of the combination shown in FIG. 6.
Figure 8:
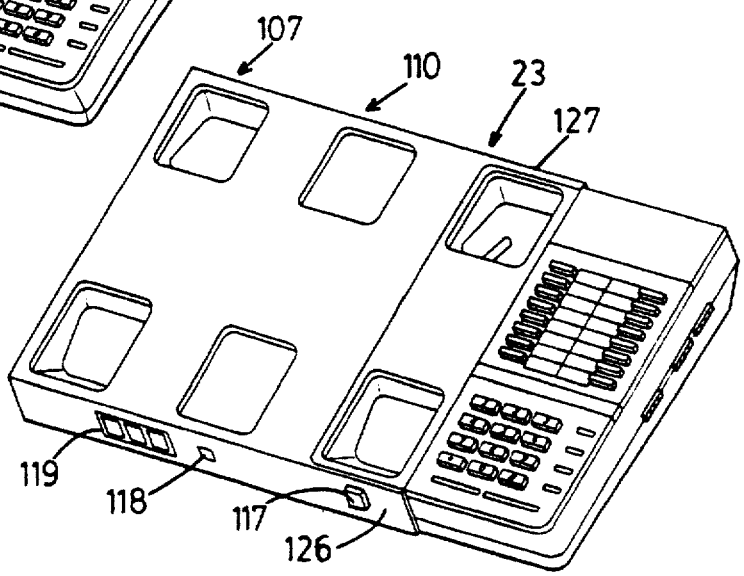
FIG. 8 is a perspective view of a slightly modified version of the combination shown in FIGS. 6 and 7.

An alternate embodiment of this invention which comprises a telephone and multi-handset adaptor combination is illustrated in FIGS. 6-8. The combination includes base 12 of a primary telephone 11 as previously described. A multi-handset adapter 100 is then added to the base 12 of primary telephone 11 to result in a multi-handset telephone. The multi-handset adapter 100 includes a top 101, a bottom 102, top and bottom edges 103 and 104, a side edge 105, and an open end 106. The adapter 100 is preferably formed of flexible plastic material but may be formed of other suitable materials. In one specific embodiment, the adapter 100 was formed of plexiglass, although it will be understood that any type of suitable material may be used.

The adapter 100 includes a plurality of cradle means for receiving a plurality of handsets. In the embodiment given in FIG. 6, the cradle means includes a first cradle means 107 which includes first and second wells 108 and 109 for receiving the ends of a handset. Adapter 100 also includes a second cradle means 110 which includes apertures 111 and 112 formed in the top 101 of adapter 100. The apertures 111 and 112 may support a handset on their own or may instead be used as a passageway through to the cradle 23 on primary telephone 11.

Referring to FIGS. 6 and 7, the adapter 100 may be slid over the cradle 23 of telephone 11 by inserting cradle 23 through the open end 106, until an edge 113 of adapter 100 engages a ridge 114 on base 12. In such a position, the apertures 111 and 112 are positioned over cradle 23 to allow a handset 37 to be placed in cradle 23 and engage hook switch 30. The other cradle means 107 provides a position for holding an additional handset.

Connecting means may be provided on adapter 100 to releasably lock the adapter 100 onto base 12 of telephone 11. In the embodiment given in the illustrations, the connecting means take the form of a protrusion 115 provided on base 12 and a slot 116 provided on wall 103 of adapter 100. When the adapter 100 is slid over cradle 23, the flexible plastic of adapter 100 can be pulled outward so that protrusion 115 is received in slot 116. Advantageously, commercially available telephones sometimes include a protrusion 115 at the top of the telephone for placement of handset 37 thereon when the phone 11 is vertically attached to a wall. In addition, a screw 117 may be inserted through aperture 118 to secure adapter 100 to the front of the phone 11.

Figure 5:
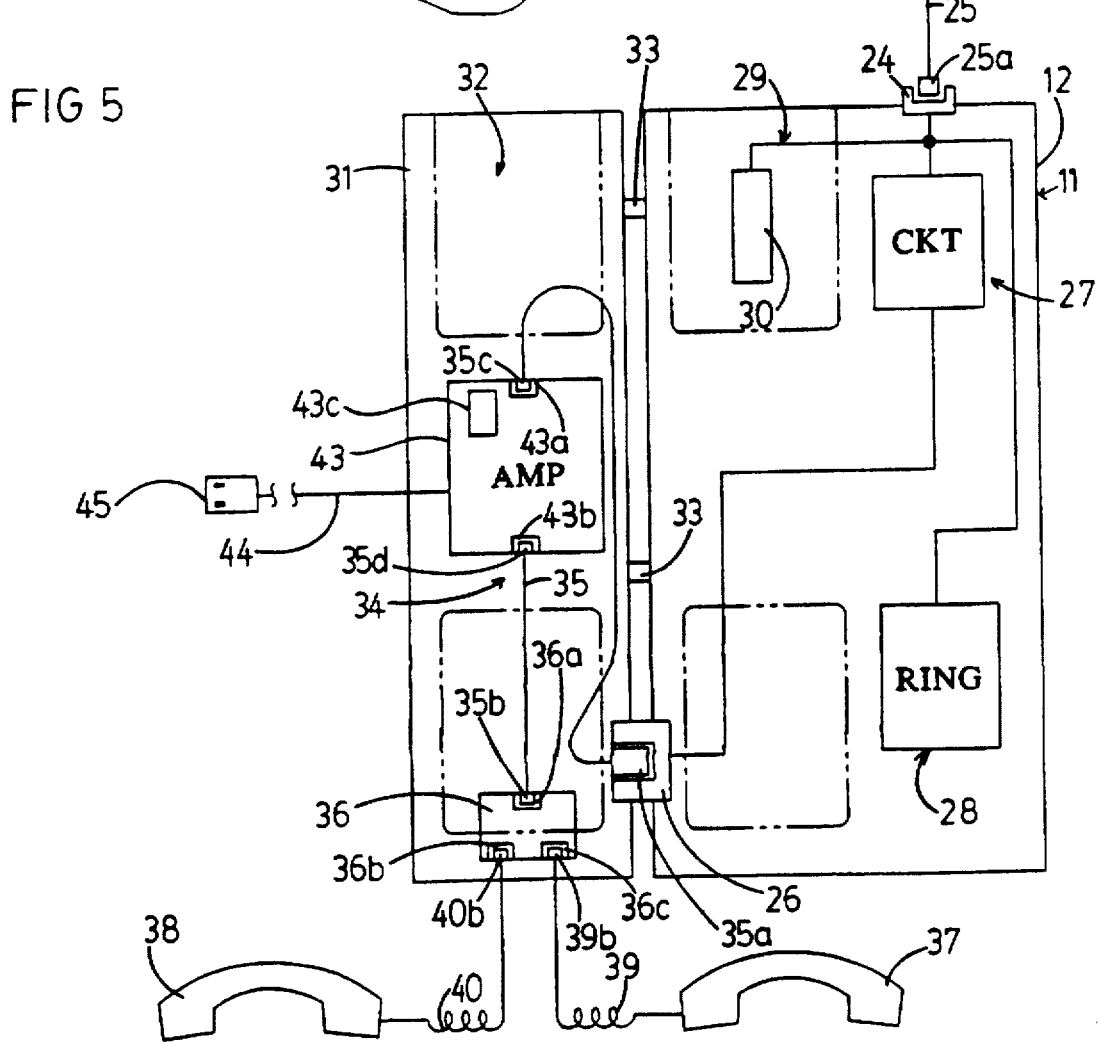
FIG. 5 is a schematic plan view of the telephone embodying this invention.

The adapter 100 includes a multi-port connector 119 which includes a plurality of handset cord ports 119a, 119b, and 119c. The adapter 100 also includes wiring means 120 for connecting multi-port connector 119 to second jack 26 of base 12 of telephone 11. Advantageously, the wiring means 120 may be the same as substantially described in connection with FIGS. 2 and 5. In particular, the wiring means 120 may include wire segments 121a and 121b, amplifier 122, rotary volume control 122a, power cord 123, plug 124, and a plug 125 for insertion in jack 26.

The adapter 100 can be constructed to provide for adding any desired number of handsets to telephone 11. In FIG. 7, the telephone includes positions for two handsets but adapter 100 can be extended to provide any number of cradle holders. In the embodiment given in FIG. 8, adapter 100 is placed adjacent to base 12 so that it includes three positions for placing three separate handsets, the cradles being cradle 23, cradle 107 and 110. A plurality of handsets can then be placed in the cradle 23, 107 and 110, and the handset cords are connected to ports of multi-port connector 119. Advantageously, adapter 100 may include positioning means for positioning the adapter 100 adjacent to base 12 of telephone 11. In the embodiment shown in FIG. 8, the positioning means takes the form of extensions 126 and 127 which project over the top and bottom of base 12 to position the adapter 100 adjacent to base 12. The extensions 126 and 127 may include an aperture 128 for engaging protrusion 115, and a securement screw 117.

The single-line multi-handset telephone of this invention allows two or more people to talk on the same telephone line using multiple handsets. However, the telephone substantially incudes only the circuitry of one telephone and is therefore less expensive as a capital or rental expense as well as only incurring one line charge from the telephone company. Advantageously, the telephone may include amplification and external power source means for ensuring effective communications through the handsets while allowing the multiple handsets and functions of the telephone to be routinely used without fear of exceeding the power limit of the external telephone line. The telephone of this invention finds particular application in situations in which two or more people at one location would like to use a telephone to communicate with an interpretation service. It is believed that such devices would be extremely beneficial in environments such as tradeshows or at hotel reception desks. However, the inventive telephone may be used in other environments when it is desirable for two or more people at one location to talk on the same telephone line without incurring the expense of using multiple telephones. For example, grandparents and parents may find such a telephone useful for talking to the children in a "group call", and such telephones may therefore find particular application in retirement homes and the like. The phones may also be useful in schools, at payphones, in the home, or practically any other environment in which it is desirable for two or more people to talk on the same telephone line without incurring the expense of multiple telephones and multiple line charges.

While in the foregoing, embodiments of the invention have been disclosed in considerable detail for purposes of illustration, it will be understood that many of these details may be varied without departing from the spirit and scope of the invention.

We claim:

1. A multi-handset telephone for permitting at least two users who speak different languages to converse face-to-face using the telephone to contact a selected interpreter comprising:

a base which includes circuitry means for communicating with an external telephone line, ringing means for signaling when an incoming call is received, a plurality of cradle means for holding a plurality of handsets and a plurality of handset ports corresponding to said plurality of cradle means;

a plurality of handsets positionable upon said plurality of cradle means and being connected to said base by a corresponding plurality of handset cords that permit a plurality of users in close proximity to speak over the plurality of handsets in a face-to-face situation;

means for selecting and contacting one of a number of off-sight interpreters for providing interpretation services to said plurality of users using said plurality of handsets from said telephone so that said plurality of persons can personally communicate through use of said interpreter.

2. The telephone of claim 1 in which amplification and auxiliary power means are operatively connected to said handset cords for powering and amplifying communications transmitted through said plurality of handsets.

3. The telephone of claim 2 in which said amplification and auxiliary power source means includes an amplifier having a power cord and plug.

4. The telephone of claim 1 in which said interpretation service selection means comprises a plurality of buttons provided on said base, each of said buttons being adapted to automatically contact a language-specific interpreter when pushed.

5. The telephone of claim 4 in which said interpretation service selection means includes at least 15 of said buttons, each of said 15 buttons being assigned to one of 15 different languages.

6. The telephone of claim 4 in which said interpretation service selection means includes a plurality of language-specific indicia, one of said plurality of said language-specific indicia being placed next to each of said plurality of buttons for indicating the language of the language-specific interpreter.

7. The telephone of claim 1 in which swivel ports connect said plurality of handset cords to said plurality of handsets.

8. A method of providing interpretation services to two or more persons at a common location, said method comprising the steps of:

providing a telephone connected to an external telephone line and having at least two handsets;

providing said first and second handsets of said telephone to at least first and second persons who speak different languages;

providing a number of off-site language interpreters;

using said telephone to contact, over said external telephone line a selected one of said number of off-site interpreters who speaks said different languages; and said selected one of said number of off-site interpreters providing interpretation services over the said at least two handsets to said first and second persons so that said first and second persons can personally communicate through use of said interpreter.

9. The method of claim 8 in which said telephone includes amplification and auxiliary power source means for powering and amplifying communications through said first and second handsets.

10. The method of claim 8 in which said telephone includes interpreter selection means for automatically contacting a selected one of said number of interpreters.

11. The method of claim 10 in which said interpreter selection means comprises a plurality of buttons and adjacent indicia for each connecting to an interpreter who speaks a language shown by said indicia.

12. A method of permitting two persons who speak different languages to communicate face to face through use of remote interpretation services, said method comprising the steps of:

providing a telephone connected to an external telephone line and having at least two handsets;

providing one of said two handsets to a first person;

providing the other of said two handsets to a second person who speaks a different language than said first person;

using said telephone to contact one of a number of off-site interpreters over said external telephone line; and having said one of said numbers of interpreters provide interpretation services to said first and second persons so that they can communicate face to face by use of the remote interpreter.

13. The method of claim 12 in which said telephone includes amplification and auxiliary power source means for powering and amplifying communications through said first and second handsets.

14. The method of claim 12 in which said telephone includes interpreter selection means for automatically contacting a selected one of said number of interpreters.

15. The method of claim 12 in which said interpreter selection means comprises a plurality of buttons and adjacent indicia for each connecting to an interpreter who speaks a language shown by said indicia.

* * * * *